United States Patent [19]

Mansour et al.

[11] Patent Number: 5,058,105

[45] Date of Patent: Oct. 15, 1991

[54] NETWORK ALTERNATE ROUTING ARRANGEMENT

[75] Inventors: M. Omar Mansour, West Long Branch; Liem T. Nguyen, Colts Neck, both of N.J.

[73] Assignee: AT&T Bell Laboratories, Murray Hill, N.J.

[21] Appl. No.: 504,359

[22] Filed: Apr. 4, 1990

[51] Int. Cl.[5] .............................. H04J 1/16; H04J 3/14
[52] U.S. Cl. ......................................... 370/16; 379/221
[58] Field of Search ................... 370/16, 94.3, 94.1, 370/14; 379/221, 14, 10; 340/827, 825.01; 371/11.1

[56] References Cited

U.S. PATENT DOCUMENTS

| | | | |
|---|---|---|---|
| 3,394,231 | 7/1968 | Hopper et al. | 379/221 X |
| 3,870,955 | 3/1975 | Ouvrier | 340/825.01 X |
| 4,284,852 | 8/1981 | Szybicki et al. | 379/221 |
| 4,345,116 | 8/1982 | Ash et al. | 379/221 |
| 4,704,724 | 11/1987 | Krishnan et al. | 379/221 |
| 4,825,206 | 4/1989 | Brice et al. | 370/16 X |
| 4,853,927 | 8/1989 | Wenzel | 370/16 |
| 4,862,496 | 8/1989 | Kelly et al. | 379/221 |
| 4,885,780 | 12/1989 | Gopal et al. | 379/221 |

OTHER PUBLICATIONS

IEEE/IEICE Global Telecomm. Conf. 1987, vol. 2 of 3, Nov. 15-18, 1987, S. Hasegawa et al., pp. 1096-1100, "Dynamic Reconfiguration of Digital Cross-Connect Systems With Network . . . ".

Data Communications, Apr. 1988, W. Cohen et al., pp. 175-183, "Building a Private Wide-Area, Fiber Backbone Network".

Primary Examiner—Douglas W. Olms
Assistant Examiner—H. Kizou
Attorney, Agent, or Firm—Frederick B. Luludis

[57] ABSTRACT

A facility is provided for enhancing the reliability of a communications network so that traffic whose flow is disrupted by, for example, a faulty link, may be quickly restored to service. In particular, such traffic is restored to service by establishing a number of orders of connectivity each formed from spare link capacity, in which each succeeding order of connectivity represents the shortest loop around a preceding order of connectivity.

2 Claims, 5 Drawing Sheets

TABLE 1

| | LINK | NODE | NODE | S-CAP |
|---|---|---|---|---|
| 202 | 101 | 100-1 | – | 36 |
| | 102 | 100-1 | 100-2 | 36 |
| 203 | 103 | 100-2 | 100-3 | 0 |
| | 104 | 100-3 | 100-4 | 36 |
| | 105 | 100-4 | 100-5 | 36 |
| 206 | 106 | 100-1 | 100-6 | 36 |
| 208 | 107 | 100-6 | 100-4 | 50 |
| | 108 | 100-2 | 100-7 | 85 |
| 209 | 109 | 100-7 | 100-8 | 25 |
| | 110 | 100-8 | 100-9 | 36 |
| | 111 | 100-9 | 100-4 | 60 |
| | 112 | 100-7 | 100-10 | 36 |
| | 113 | 100-10 | 100-11 | 36 |
| | 114 | 100-11 | 100-9 | 15 |
| | 115 | 100-10 | 100-12 | 36 |
| | 116 | 100-12 | 100-13 | 36 |
| | 117 | 100-13 | 100-11 | 36 |

| 100-1, 100-2, 100-3, 100-4 | ORIGINAL PATH |
| 100-2, 100-1, 100-6, 100-4, 100-3 | SHORTEST LOOP | ns
NETWORK ALTERNATE ROUTING ARRANGEMENT

FIELD OF THE INVENTION

The invention relates to alternate routing of traffic in a communications network, and more particularly relates to an arrangement for establishing such alternate routes.

BACKGROUND OF THE INVENTION

A disruption in telecommunications service is typically caused by an inoperable communications path (link) or switching office. A disruption of such a service could be very costly to business users who rely on telecommunications services in the operation of their respective businesses. For example, a business could lose revenue as a result of a failure to receive so-called "telemarketing sales" when a disruption in telecommunications services occurs. Moreover, the amount of lost revenue would be directly proportional to the duration of the disruption.

Most telecommunications networks typically deal with a service disruption by establishing an alternate route around the inoperable link or switching office. One goal in doing so is to select the most efficient alternate route, one having the least number of nodes and links. The task of identifying such an alternate route in a small network comprising a small number of nodes (switching offices) and links is typically a simple matter. The reason for this is that the number of alternate routes that may be used for a particular failed link is usually small. However, the task of identifying the most efficient alternate routes in a large communications network composed of a large number of nodes and links is not an easy task. The reason for this is that in a large network the number of alternate routes that may be used for the rerouting of traffic is also large, thereby making the selection of the most efficient alternate route difficult to identify.

Accordingly, there is a need for an arrangement which quickly establishes alternate routes circumventing an inoperable link or switching office, such that a service disruption is virtually transparent to the telecommunications user (subscriber).

SUMMARY OF THE INVENTION

A facility is provided for establishing alternate paths for rerouting traffic which is blocked as a result of a failure of a communications link, or communications node, in which the alternate paths are composed of expanding loops formed from a number of orders of connectivity each representing the shortest path around a lower order of connectivity, and in which each loop is established using spare capacity.

DETAILED DESCRIPTION

Figures 1, 2:
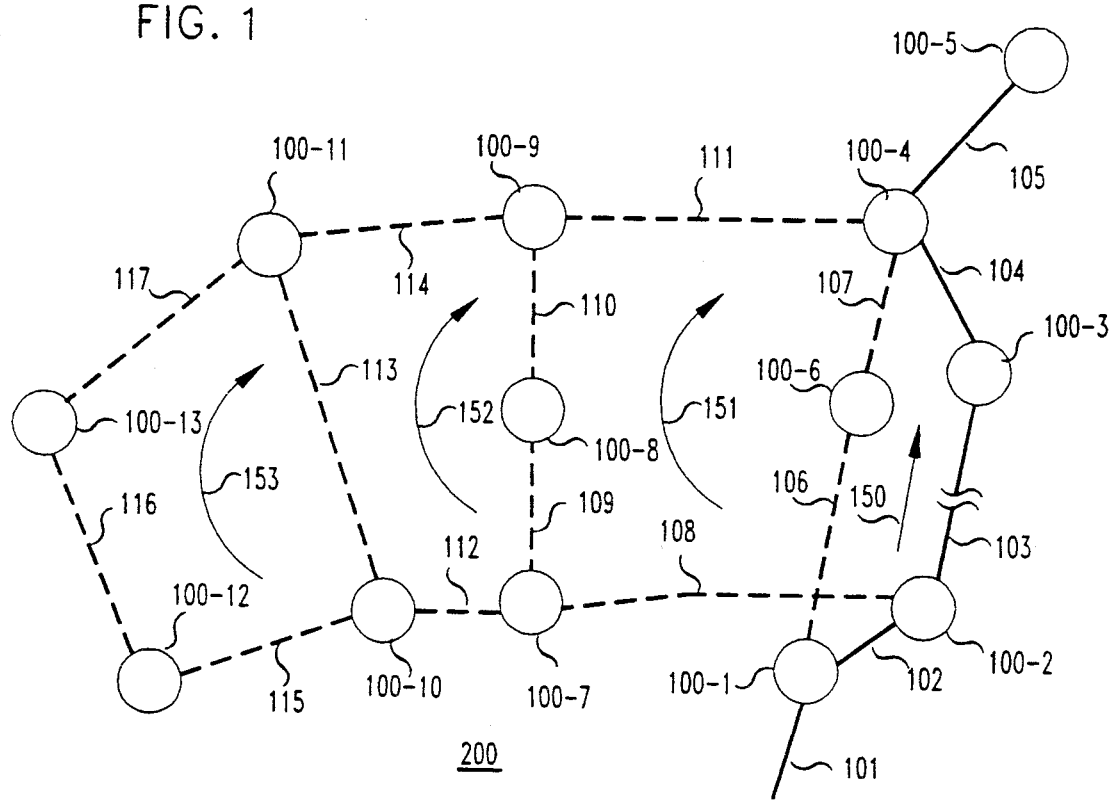
FIG. 1 shows a portion of a network comprising a plurality of nodes and a plurality of links interconnecting individual pairs of the nodes.
FIG. 2 illustrates a Table for tracking the spare capacity contained in the links of FIG. 1.

Turning now to FIG. 1, there is shown a simplified block diagram of a section of an inter-exchange network 200, such as, for example, the AT&T optical fiber network, comprising switching offices 100-1 through 100-13. (For the sake clarity, all of the switching offices are not shown in the FIG.) Each switching office, or node, includes, inter alia, what is commonly referred to as a digital cross-connect arrangement (DCA) of the type known in the art. One exemplary arrangement which may be advantageously employed as a DCA is the Digital Access and Cross-Connect System III commercially available from AT&T. As will be discussed below, a centralized operations system monitors the overall health of the network. However, it suffices to say at this point that the operations system does this by polling status and alarm processors contained in each switching office. Such processors monitor key components of the associated switching office and links terminating thereat.

It is seen from FIG. 1 that the switching offices (nodes) 100-1 through 100-13 are interconnected via respective links 110-1 through 110-117. Such links may be, for example, optical fiber cables each bearing a number of individual optical fibers. Within network 100, the end points of each of the links 101 through 117 terminate at respective ports of the DCA contained in the associated node. In this way, a DCA cross-connects signals that are transported via optical fibers (or other broadband digital transport systems) that are in service, and thereby determines the routing of these signals. What this means is that a signal received via one link may then be cross-connected (routed) to one of a number of other links also connecting to the DCA based on the destination of the signal, in which the destination may be the associated node itself or one of the other network nodes.

In this way a DCA, for example, the DCAS III contained in node 100-1, operates as a conduit for routing signals from an originating node, for example, node 100-1, to a terminating node, for example, node 100-5.

As mentioned above, a link may be comprised of a number of optical fibers with each fiber having a number of channels. A 44.7 megabits per second channel is commonly referred to as a DS3 channel, or DS3 circuit. In an illustrative embodiment of the invention, the well-known FT Series G optical fiber system, which is commercially available from AT&T and in which each fiber has 72 DS3 circuits, is employed to implement the aforementioned links. It therefore can be appreciated that the capacity of an optical fiber cable carrying an appreciable number of optical fibers is indeed large. Because of this, the capacity of an optical fiber cable, for example, the cable interconnecting the nodes of FIG. 1, is frequently not fully used. Accordingly, the spare DS3 circuit capacity beyond the in-service need may be inventoried so that it can be readily identified to establish a new route for traffic that is blocked as a result of a failure. The inventory of spare DS3 circuits may be kept current in a database associated with the aforementioned centralized operations by tracking in the database the spare DS3 circuits. The operability of such circuits may also be kept current in the database as a result of the status and alarm reports generated by the aforementioned status and alarm processors.

Advantageously then, such spare capacity which is not marked faulty may be used to establish a new, alternate route in the event that an optical link between nodes, or a node itself, becomes inoperable. However, to be most effective as a temporary replacement for an inoperable link, the established alternate route formed from such spare capacity should be the shortest route that is available, that is, a route comprising the fewest number of nodes. The reason for this is that the route needs to be established within a very short period of time—illustratively within several seconds—so that the service disruption is transparent to the network user.

It is best at this point to briefly define a number of terms that will be used in the ensuing discussion of an illustrative example, in which it is assumed that link 103 has suddenly become inoperable, for whatever reason. (It is to be understood of course that the following discussion pertains equally well if it were assumed that a node, for example, node 100-3, rather than a link, suddenly became inoperable.)

In particular, (a) nodes 100-2 and 100-3 are defined as being the failure-end nodes of the inoperable link 103; (b) nodes 100-1 and 100-5, which are assumed to be the respective source and destination of the traffic carried by failed link 103, are defined as service-end nodes, respectively; (c) nodes 100-1, 100-4 which are assumed to be the points where traffic carried by inoperable link 103 enters and exits the alternate route, are defined as transfer-end nodes, and (d) the traffic handled by inoperable link 103 is defined as being the "original" traffic. In addition, the term "alternate route" is defined as that part of the loop that is used to reroute the original traffic, and the term "intermediate node" is defined as a node between the transfer-end nodes. (It is noted that hereinafter the terms "loop" and "alternate route" will be used interchangeably.)

In an illustrative embodiment of the invention, and as mentioned above, network 200 includes a centralized operations system (not shown in FIG. 1) which monitors the operability of each network link and node. Thus, the centralized operations system may readily identify when a node or link suddenly becomes inoperable. For example, both nodes 100-2 and 100-3 would generate alarms indicating the loss of signals carried by link 103 and would pass those alarms to the operations system. The operations system after consulting other available data would conclude that link 103 is inoperable. At that point, the operations system would invoke means arranged to identify and establish the most efficient loop for rerouting the original traffic affected by the failed link or node. That is, the centralized operations system determines in real time the shortest and most efficient loop for alternate routing of the affected traffic.

The operations system does this by (a) determining the identity of the failure-end offices, which in the present case, are nodes 100-2 and 100-3; (b) then determining in real time, in accordance with an aspect of the invention, the least number of links and associated (intermediate) nodes that may be used to establish a possible loop whose end points terminate at the failure-end offices; (c) then determining the identity of each transfer-end node; and (d) then determining the identities of the intermediate nodes that would be used to establish the loop.

In particular, the identity of each link in the network as well as the identities of the nodes connecting thereto is maintained in a link table, as shown in FIG. 2. It is seen from the FIG., that each line of TABLE 1 identifies a respective network link and identifies the nodes which connect to the end points thereof. In addition, the last column of TABLE 1 identifies the number of available spare DS3 circuits in the identified link. As mentioned above, the number of spare channels for a given link is updated as they are placed in and out of service, or become faulty. Accordingly, then, it is a simple matter to index TABLE 1 and read out the identities of the failed end offices which connect to respective end points of link 103, which in the present case happen to be nodes 100-2 and 100-3, as shown at line 202.

Once the failure-end nodes have been identified, then the operations system identifies the shortest loop around the failed link. This is done by mapping, in real time and in the form of a tree-like structure, various paths contained in Table 1, in which the paths begin at one of the failure-end nodes, e.g., node 100-2 and lead to the other failure-end node, e.g., node 100-3. The path which is first to lead (terminate) at node 100-3 is then selected as being the shortest loop around failed link 103. Specifically, and referring to both FIGS. 1 and 2, the arrangement determines from lines 202 and 208 that node 100-2 connects to nodes 100-1 and 100-7 via links 102 and 108, respectively, and forms the first level of the tree. At a second level of the tree, the arrangement then determines from TABLE 1 (line 207) that node 100-7 connects to nodes 100-8 and 100-10 via links 109 and 112, respectively. The arrangement proceeds in a similar manner for node 100-1, and continues building the tree in the manner just described. As mentioned above, the arrangement then terminates the process when one of the paths of the tree is first to reach node 100-3, as shown for the path comprising nodes 100-1, 100-6, 100-4 and links 102, 106, 107 and 104. As mentioned above, the first path of the tree which reaches node 100-3 will be the shortest path around the failed link.

Figures 3, 4:
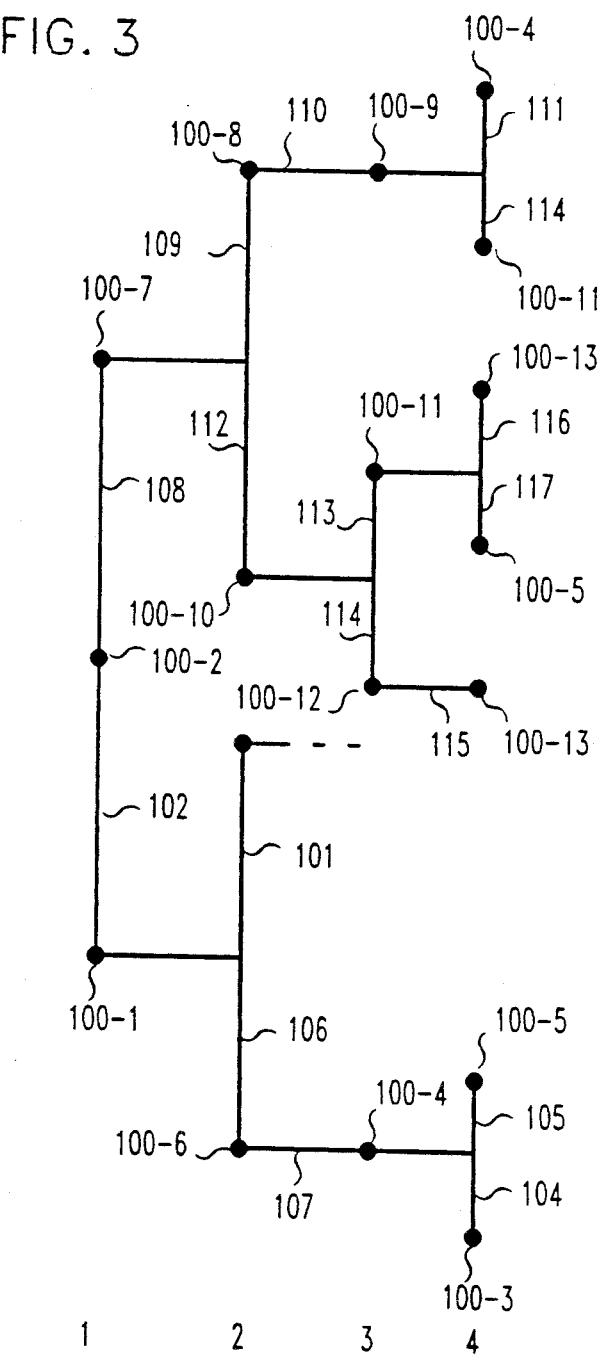
FIG. 3 illustrates the manner in which a fist-order expanded loop is located within the network of FIG. 1 using the Table of FIG. 2.
FIG. 4 illustrates the manner in which so-called transfer-end nodes may be identified once an expanded loop has been located.

The operations system then identifies the transfer-end nodes by noting which nodes are contained in both the failed path (i.e., nodes 100-1, 100-2, 100-3 100-4), and the shortest loop (i.e., nodes 100-2, 100-1, 100-6, 100-4 and 100-3). In the present illustrative example, nodes 100-1 and 100-4 would be the transfer-end nodes since they are common to both paths, as shown in FIG. 4. The arrangement then identifies the intermediate nodes by noting which nodes are contained in the shortest loop between the transfer-end nodes but not in the original path. As such, node 106 would be identified as being the intermediate node. (It is noted that the shortest loop is defined herein as being the first order of connectivity around the failed link, i.e., a connectivity comprising the fewest number of links.)

It is seen in FIG. 1, that the operations system has identified loop 150 comprising nodes 100-2, 100-1, 100-6, 100-4 and 100-3 and links 106 and 107 as the shortest and most efficient alternate route for rerouting the original traffic around inoperable link 103. (It is noted that the alternate route of loop 150 is characterized in the FIG. as a dashed line.) Once loop 150 has been identified, then the operations system sends to each intermediate node, e.g., node 100-6 a set of commands causing the DCA contained in that node to cross-connect the spare capacity of link 106 to the spare capacity of link 107 in order to extend the new path defining the alternate route. Each such command comprises a number of fields specifying the order of switching signals to so-called ports on the DCA of node 100-6 which terminate the ends of spare DS3 circuits of link 106 to the ends of the spare DS3 circuits of link 107. The operations syst then sends to the DCA at transfer-end node 100-4 a set of commands directing the order of cross-connecting between the ports which terminate the opposite ends of the spare DS3 circuits of link 107 to the ports terminating the DS3s of link 105 which transported the original traffic. The operations system then sends to the DCA of node 100-1 a set of commands directing the order of cross-connecting between the ports terminating the failed DS3s of link 101 and ports terminating the ends of the spare DS3s of link 106 connecting to node 100-1.

In a similar manner, other portions of the total failed traffic carried by failed link 103 which is not restored to service may also be rerouted via a path established from other spare DS3 circuits of generally the same loop, but between different pairs of transfer-end nodes in that loop, as will be discussed below.

It is seen from the foregoing that, in accord with an aspect of the invention, a first order of connectivity establishing a new loop may be quickly identified and placed in service. As such, a service disruption is quickly dealt with, thereby making such a disruption transparent to the network user.

However, the possibility may arise in which the capacity of the first-order of connectivity may not be sufficient to carry all of the original traffic. To deal with this problem, we divide the original traffic load carried by the inoperable link across a number of orders of connectivity in which, in accordance with another aspect of the invention, each succeeding order of connectivity (loop) is an expanded version of a proceding, lower order of connectivity (loop) in the series.

Specifically, and referring once again to both FIGS. 1 and 2, it is seen that TABLE 1 identifies the spare capacity (S-CAP) for each link listed therein. The number of available spare DS3 circuits in a link is maintained by the operations system. Thus, if a a spare DS3 circuit becomes inoperable (faulty), or it is used for some other purpose, then the operations system changes TABLE 1 accordingly. For example, it is seen from TABLE 1, that the operations system has entered the value of zero (0) for the number of spare fibers for link 103 as a result of the inoperability of the latter link. In addition, the operations system would change the value of the spare capacity listed for links 106 and 107 as a result of using some or all of that capacity to establish loop 150.

Accordingly, and as a result of maintaining TABLE 1, the operations system may go on to establish higher orders of connectivity in the event that the capacity of loop 150 is insufficient to fully restore all of the original traffic to service. For example, if it is assumed that th level of the original traffic is 88 DS3s, then the capacity of loop 150 is limited by the spare capacity of link 106, which is 36 DS3s, as shown at line 206, meaning that one or more additional higher orders of connectivity would need to be established to carry the remaining 52 DS3s of the original traffic. Then, in that instance, the operations system would search through TABLE 1 to identify the next shortest loop, or second-order of connectivity to restore the remainder of the original traffic, if such connectivity is indeed available.

Figure 5:
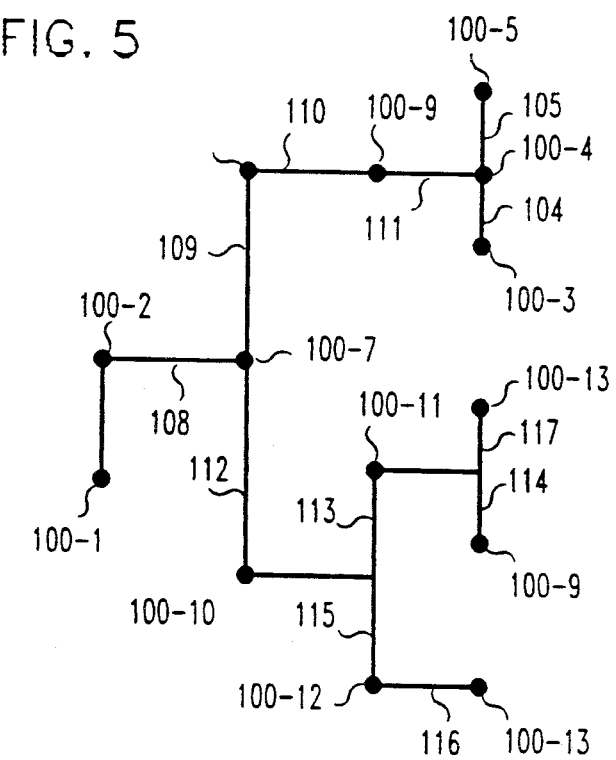
FIG. 5 illustrates the manner in which a high-order expanded loop is located within the network of FIG. 1 using the Table of FIG. 2.

The operations systems does this similar to the way it identified the first-order of connectivity. That is, by mapping the link information contained in TABLE 1 into various paths beginning at one of the failed-end nodes, for example, node 100-2, as shown in FIG. 5. It is seen that the operations system has terminated the search at the third level as result of one of the paths comprising nodes 100-7 through 100-9 and 100-4 being the first to reach node 100-3. Similarly, the transfer-end nodes would be identified as those nodes that are common to both the original path and next order of connectivity, namely nodes 100-2 and 100-4. Similarly, the intermediate nodes would then be identified as those nodes not contained in the original path but contained in the next (second) order of connectivity, namely nodes 100-7 through 100-9. Returning to FIGS. 1 and 2, it is seen that of links 108 through 110 and 111 that may be used to form the next order of connectivity, link 109 has the smallest value of spare capacity, i.e., 25 DS3s, as shown at line 209. Accordingly, that capacity limits the number of remaining DS3 circuits of the original traffic that may be restored to service using the second-order of connectivity characterized by loop 151.

Similarly, to establish loop 151, the operations system sends to intermediate node 100-7 a set of commands directing the associated DCA to order its respective cross-connect scheme so that 25 spare DS3 circuits of link 108 are switched to respective spare DS3 circuits of link 109 connecting to node 100-7. The operations system sends similar messages to the other intermediate nodes 100-8 and 100-9 so that a path comprising 25 DS3 circuits is established between links 108 at node 100-7 and link 111 at node 100-9. The operations system then sends to transfer-end node 100-4 commands directing the DCA contained therein to order its cross-connect scheme so that the newly added 25 DS3 circuits of link 111 are switched to 25 of the remaining failed service DS3 circuits of link 105 which had been carrying a portion of the original traffic. Upon completing the latter task, the operations system then sends to transfer-end node 100-2 a similar message causing the DCA contained therein to cross-connect 25 of the remaining DS3 circuits of link 102 in the same order to the corresponding spare DS3s of link 108, thereby completing the second-order connectivity loop.

It is noted that in conjunction with the foregoing task the operations system would subtract 25 spare DS3 circuits from the values shown in the S-CAP column of TABLE 1 for links 108 through 111 to show that those circuits are no longer available.

Since a total of 61 DS3 circuits of original traffic has been restored to service as a result of establishing first-order and second-order connectivity loops 150 and 151, the operations system would then go on to establish one or more higher orders of connectivity to restore the remainder of the original traffic. It is seen from FIG. 1, that the operations system has located and placed into service in the manner described above third-order connectivity loop 152 comprising 15 DS3 circuits, in which loop 152 is established using spare capacity of links 108, 112 through 114 and link 111. In addition, the operations system has restored and placed into service the remaining 12 DS3 circuits of the original traffic by locating and establishing, in the manner described above, fourth-order connectivity loop 153.

Thus, in accordance with the invention, original traffic that is disrupted due to a network failure is quickly restored to service by first locating and establishing a first-order connectivity loop, and then going on to establish one or more higher orders of connectivity, if needed.

Figure 6:
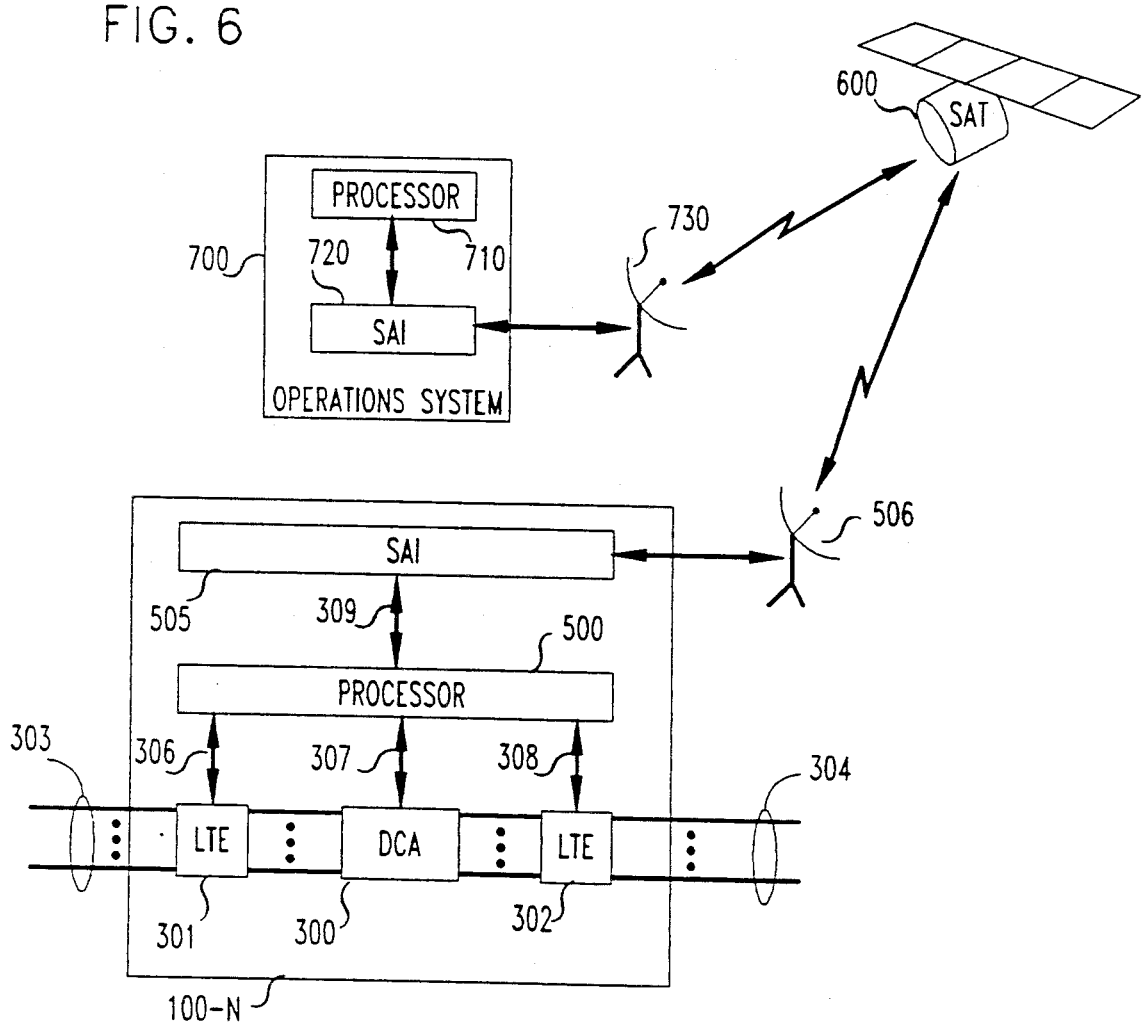
FIG. 6 is a block diagram of a node of the network of FIG. 1 in which the node is disposed in a system in which the principles of the invention may be practiced.

Turning now to FIG. 6, there is shown in block diagram form an illustrative embodiment of the system architecture which implements the invention. In particular, node 100-N generally represents any one of the nodes forming network 200 and includes DCA 300, status processor 500 and satellite antenna interface (SAI) 505 for interfacing processor 500 with satellite dish antenna 506.

As mentioned above, DCA 300 may be the Digital Access and Cross-Connect System III available from AT&T. Links 303 and 304 represent each of the links which also form network 200. As also mentioned above, a link may be a number of optical fibers in a cable with each fiber providing a number of DS3 circuits (channels). The DS3 circuits of the optical fibers forming links 303 and 304 connect to respective ports of DCA 300 via Line Terminating Equipment (LTE) 301 and 302, respectively. Such line terminating equipment may be, for example, the FT Series G line terminating equipment available from AT&T. Besides providing termination sites for the individual fibers of a cable, such equipment is also arranged to monitor the operability of each fiber and DS3 circuit terminated thereat and report the status of each such circuit when polled by processor 500 via a respective one of the communication busses 306 and 308.

In response to receipt of an alarm status indicating a failure, processor 500 initiates a so-called "leaky bucket" process as a means of determining whether the failure is either an intermittent or hard fault. That is, if the fault persists for a predetermined period of time, for example, one to thirty seconds, and causes an associated fault threshold value to be met, then processor 500 considers the fault to be a hard fault. The presence of a number of faults indicating that a like number, for example, one-half, of the spare DS3 circuits of a link are inoperable and an indication that a service line is faulty, accelerates the leaky bucket process.

Processor 500 reports the status of each such fiber as well as any hard fault to operations system via bus 309, satellite antenna interface circuit 505 (hereafter SAI 505), dish antenna 506 and satellite 600. Satellite 600, may be, for example, the AT&T Skynet satellite communications service. That is, such reports are formed into messages using the well-known X.25 protocol resulting in so-called baseband signals, which are then passed to SAI 505. SAI 505 modulates such baseband signals using an intermediate frequency (IF) carrier and then modulates the result using a radio frequency (RF) carrier in the KU band for presentation to 2.4 meter dish antenna 506. Dish antenna 506, in turn, transmits the modulated signals to satellite 600, which then retransmits the signals for receipt by 2.4 meter dish antenna 730. SAI 720 demodulates the signals that it receives from antenna 730 and supplies to processor 710 of operation system 700 the resulting processor 500 message(s).

Processor 710, which may be, for example, the Hewlett Packard Co. HP850 computer, updates TABLE 1 of FIG. 2 contained in the memory thereof. Processor 710 also updates other such tables (not shown) that are designed to track the status of fibers that are in service. In addition, processor 710, responsive to receipt of a node processor 500 message indicating an inoperable link, invokes the program that is designed to implement the invention and locate spare capacity in order to establish one or more orders of connectivity so that the affected original traffic may be restored to service. When the program locates such capacity, it then sends messages to each DACS that will be involved in establishing such connectivity, as mentioned above. That is, the program supplies to SAI 720 for transmission to a particular DACS a connectivity message, in which the message includes in a header the identity of the associated node. SAI 720, in turn, modulates, in the manner described above, the signals forming the connectivity message and supplies the result to antenna 730 for transmission to satellite 600. Satellite 600 retransmits the connectivity message, which is received by each of the network nodes via their respective antennas. However, the message is accepted only by that processor 500 whose associated network node address is contained in the message. The processor 500 then passes the message to its associated DACS via bus 307 so that the latter may order its switching scheme to establish a portion of the desired restoration loop.

Figure 7:
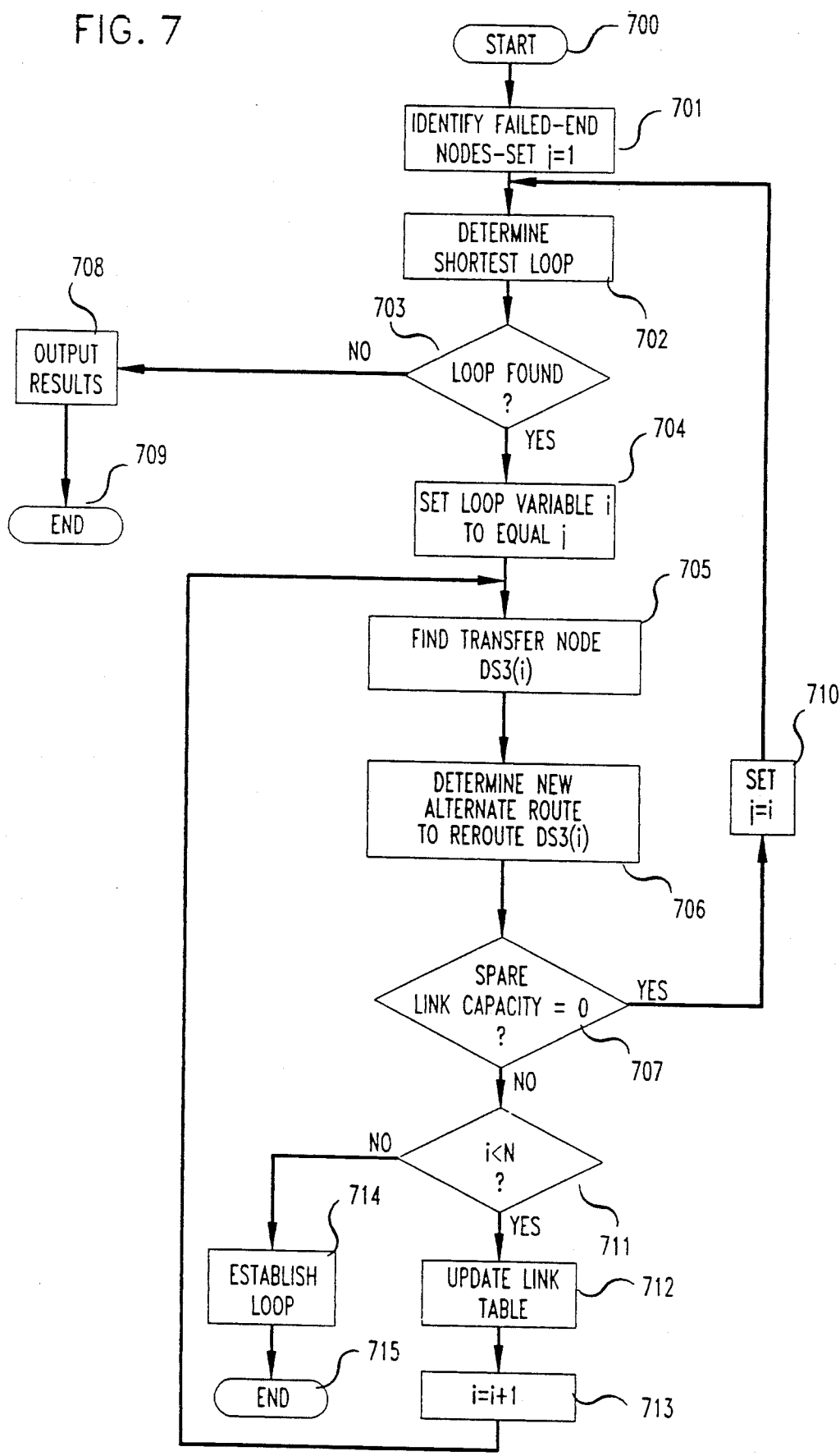
FIG. 7 is a flow chart of the software which implements the invention in the operations system of FIG. 6.

Turning now to FIG. 7, there is shown a flow chart of the program which implements the invention in processor 710. Specifically, when the program is invoked at block 700 it proceeds to block 701 where it determines the identity of each of the failure-end nodes and the link that interconnects the failure-end nodes, in which it is assumed that that link comprises N DS3 circuits. (The link interconnecting failure-end nodes will hereinafter be referred to as the failed link.) The DS3 circuits of the fibers making up that link will then be referred to as the failed DS3s. In addition, the program at block 701, initializes a so-called outer-loop variable j to the value of one and then proceeds to block 702, in which j indicates the first failed DS3 to be rerouted over the next shortest loop. At block 702, the program "calculates" the shortest loop around the failed end nodes. The program does this in the manner described above. That is, by building a tree-like structure using the data contained in the link Table and starting from one of the failed-end nodes and noting when one of the branches of the structure is the first to reach the other one of the failed-end nodes.

The program then proceeds to block 703 where it checks to see if it was successful in locating such a loop. If the program finds that it was not successful, then it proceeds to block 708. If, on the other hand, the program finds that it had been successful, then it proceeds to block 704 where it initializes a so-called inner loop variable to the current value of outer-loop variable j, in which i indicates the number of DS3s that the program will restore via the shortest loop. (It is noted that at this point (i.e., the first pass through block 704) the value of j is equal to one.) The program then proceeds to block 705.

At block 705, the program determines the identity of the transfer-end nodes for the failed DS3(i) circuit, which would be the first DS3 circuit of the failed link that is to be processed when the value of i=1. The program then proceeds to block 706 where it determines a new alternate path for rerouting the failed DS3(i). The new alternate path, or route, is thereafter formed from spare DS3s defining the shortest loop between the transfer-end nodes determined at blocks 702 and 705, respectively. The program then associates the failed DS3(i) with the new alternate route and then proceeds to block 707 where it checks to see if the spare capacity of the expanded loop has been exhausted. The program proceeds to block 711 if it finds that not to be the case. Otherwise, the program proceeds to block 710.

At block 711, the program checks to see if it has completed the task of locating new alternate routes for all failed DS3 circuits, and proceeds to block 714 if it finds that to be the case. Otherwise, the program proceeds to block 712 where it updates the associated link Table to decrease the capacity of the expanded loop by one spare DS3 circuit. The program then proceeds to block 713 where it increments the value of i by one and then returns to block 705 to process the next failed DS3 circuit(i+1).

As mentioned above, the program reaches block 714 when the last of the failed DS3 circuits has been associated with a spare DS3 circuit contained in the shortest loop. At block 714, the program transmits the commands to the pertinent DACS as a means of establishing the expanded loop(s) and restoring the original traffic to service. The program then exits via block 715.

The program reaches block 710 when it finds that it has exhausted the capacity of the expanded loop, which means that a number of failed DS3 circuits still need to processed, i.e., a higher-order of connectivity (loop) needs to be located. Accordingly, the program sets the outer-loop variable to j to track the number of DS3 circuits that have been processed and then proceeds to block 702 to locate a higher-order loop for the remaining failed DS3 circuits. As mentioned above, the program then proceeds to block 703 and then proceeds to block 708 if a loop had not been found. At block 708, the program outputs an appropriate message identifying the failed DS3 circuits which could not be alternately routed and then exits at block 716. Otherwise, the program proceeds to block 704 to continue the rerouting process on a higher order of connectivity.

The foregoing is merely illustrative of the principles of our invention. Those skilled in the art may be able to devise numerous arrangements, which, although not explicitly shown or described herein, nevertheless, embody those principles that are within its spirit and scope. For example, the invention may be employed in other types of networks, such as so-called private networks. Moreover, the links themselves may be comprised of a transmission medium other than optical fiber, such as for example, copper wire.

We claim:

1. An arrangement for use in a communications network comprised of a plurality of nodes interconnected by a plurality of links, said arrangement comprising
   means, responsive to a disruption of original traffic between at least two of said nodes, for locating a first order of connectivity that may be established using spare capacity contained in individual ones of said links, and
   means for then establishing said first order of connectivity using said spare capacity to route said original traffic around said disruption, wherein said means for locating includes means for identifying intermediate and transfer-end nodes that connect to respective end points of the spare capacity of respective ones of said individual ones of said links, and wherein said means for establishing includes means for establishing said first order of connectivity beginning at said intermediate nodes and ending at said transfer-end nodes.

2. An arrangement for use in a network comprising
   a plurality of nodes interconnected by a plurality of links, and
   means, responsive to a disruption of traffic flowing from one of said nodes to another one of said nodes via a respective one of said links, for locating and establishing a number of higher-orders of connectivity each formed from spare capacity contained in respective individual ones of said links so that said traffic may be divided among said higher-orders of connectivity as a function of their respective spare capacities, wherein said means for locating and establishing includes means for identifying for each of said higher-orders of connectivity respective intermediate and transfer-end nodes, and wherein each of said higher-orders of connectivity is established by interconnecting its respective intermediate and transfer-end nodes using the spare capacity of respective ones of said individual ones of said links connected to those nodes.

* * * * *